United States Patent [19]
Hert et al.

[11] Patent Number: 5,312,856
[45] Date of Patent: May 17, 1994

[54] THERMOPLASTIC ELASTOMER BASED ON POLYNORBORNENE AND POLYVINYL CHLORIDE

[76] Inventors: Marius Hert, 49 Rue Max Carpentier, 27470 Serquigny; Christian Dousson, "Les Aumones" Saint-Victor de Chretienville, 27300 Bernay, both of France

[21] Appl. No.: 720,440

[22] Filed: Sep. 9, 1991

Related U.S. Application Data

[63] Continuation of PCT/FR90/00794, Nov. 6, 1990.

[30] Foreign Application Priority Data

Nov. 8, 1989 [FR] France .................. 89 14680

[51] Int. Cl.$^5$ ............................ C08J 3/18; C08L 23/20
[52] U.S. Cl. ............................ 524/297; 524/296; 524/502; 524/515; 524/518; 525/210
[58] Field of Search ............... 524/502, 515, 518, 296, 524/297; 525/210

[56] References Cited

U.S. PATENT DOCUMENTS

| | | | |
|---|---|---|---|
| 4,203,884 | 5/1980 | Coran et al. | 260/33.6 AQ |
| 4,329,270 | 5/1982 | Meyer, Jr. et al. | 524/518 |

FOREIGN PATENT DOCUMENTS

| | | |
|---|---|---|
| 56-059857 | 5/1981 | Japan . |
| 59-164357 | 9/1984 | Japan . |
| 61-231051 | 10/1986 | Japan . |

*Primary Examiner*—Paul R. Michl
*Assistant Examiner*—U. K. Rajguru
*Attorney, Agent, or Firm*—Finnegan, Henderson, Farabow, Garrett & Dunner

[57] ABSTRACT

This composition comprises a mixture of 20 to 70 parts by weight of polynorbornene, crosslinked or uncrosslinked, 80 to 30 parts by weight of a polymer based on vinyl chloride and of at least one plasticiser customary for polynorbornene and the polymer based on vinyl chloride in an amount sufficient for reducing the glass-transition temperature of polynorbornene down to the range of rubbers. To prepare the thermoplastic composition comprising crosslinked polynorbornene, a mixture of polynorbornene, a polymer based on vinyl chloride, a plasticiser customary for polynorbornene and the polymer based on vinyl chloride and a crosslinking system is kneaded at a temperature sufficiently high and during a period sufficiently long for crosslinking polynorbornene.

Applications: Manufacture of flexible tubes, seals for the construction and automobile industries, protective bellows for the automobile industry, injection-moulded articles, such as solid wheels for the toy industry, and the like.

12 Claims, No Drawings

THERMOPLASTIC ELASTOMER BASED ON POLYNORBORNENE AND POLYVINYL CHLORIDE

This application is a continuation of international application no. PCT/FR90/00794 (WO 91/07464), filed Nov. 6, 1990.

The present invention relates to thermoplastic compositions and more specifically to thermoplastic elastomer compositions comprising mixtures of polynorbornene and polyvinyl chloride.

Polymers of relatively high molecular weight are in general incompatible with one another. When two polymers of different nature are mixed, the mixture has in general poor mechanical properties, such as rupture strength and elongation at break. A pair of polymers is rarely sufficiently compatible to form a mixture having mechanical properties which are as good as those of the one showing poorer performance. However, when two polymers are compatible, the resulting mixture can have an advantageous combination of properties, i.e., apart from good mechanical properties, it can also have other favourable characteristic features.

Thus, the U.S. Pat. No. A-4,203,884 teaches that compositions comprising a mixture of a thermoplastic crystalline polyolefin, polynorbornene and an amount of plasticiser for polynorbornene sufficient for reducing its glass-transition temperature down to the range of rubbers have advantageous properties. More specifically, this document discloses compositions comprising a mixture of 75 to 10 parts by weight of polyolefin, 25 to 90 parts by weight of polynorbornene and, per 100 parts by weight of polynorbornene, 30 to 400 parts by weight of plasticiser, said compositions being elastoplastic, i.e. they have elastomeric properties while, at the same time, they can be processed like thermoplastics. In the molten state, a portion of the plasticiser can be present, according to this technique, in the thermoplastic polyolefin phase. After cooling, the plasticiser migrates to a large extent from the crystalline polyolefin phase towards the polynorbornene phase and becomes part of the latter. In this manner, the plasticiser improves the thermoplasticity or application range of the composition. As a general rule, at a given degree of thermoplasticity, the greater the amount of plasticiser the less the amount of polyolefin required.

The U.S. Pat. No. A-4,203,884 likewise discloses compositions comprising a mixture of 10 to 90 parts by weight of crystalline polyolefin and 90 to 10 parts by weight of crosslinked polynorbornene dispersed in the form of small-sized particles, and plasticiser in an amount sufficient for reducing the glass-transition temperature of polynorbornene down to the range of rubbers. Thus, the crosslinking of polynorbornene improves the balance between the properties of the composition, in particular the rupture strength, the solvent stability and the high-temperature properties. Compositions of this type are obtained by a dynamic vulcanisation process, according to which a mixture of polynorbornene, plasticiser, polyolefin, and crosslinking agents is kneaded at a temperature sufficient for crosslinking polynorbornene.

Of the crystalline thermoplastic polyolefins usable according to the U.S. Pat. No. A-4,203,884, polyethylene and polypropylene may be mentioned, the latter being preferred as shown by comparing the results illustrated by Tables 1 and 2 of the document cited. More specifically, this document teaches that compositions comprising 20 to 70 parts by weight of crosslinked polynorbornene, 80 to 30 parts by weight of polypropylene and a sufficient amount of plasticiser for polynorbornene have:

- a Shore A hardness of at least 73 or a Shore D hardness,
- a rupture strength (determined according to the ASTM Standard D 1708-66) between 10 and 23 MPa,
- a swelling ratio by volume in ASTM 3 oil, measured according to the ASTM Standard D471, after 166 hours at 70° C. of more than 35%;
- an elongation at break (determined according to the ASTM Standard D 1708-66) between 90 and 290%, and
- a modulus of 100% elongation between 4.5 and 20.9 MPa.

The balance of properties which has just been described for these compositions of the prior art is not satisfactory for the majority of applications of thermoplastic elastomers: the Shore hardness, rupture strength and the modulus of 100% elongation are too high, while the elongation at break is too low. Thus, the problem which the present invention aims to solve consists in preparing thermoplastic elastomer compositions based on crosslinked polynorbornene which have at least one of the following, preferably all of the following, properties:

- a Shore A hardness not exceeding about 65,
- a compression set after 22 hours at 70° C., not exceeding about 45%,
- an elongation at break, according to the ASTM Standard D 1708, of at least about 230%, and a modulus of 100% elongation not exceeding about 3.5 MPa,
- a swelling ratio by volume in ASTM 3 oil of less than about 20%.

The Applicant has proven that this objective can be achieved by using a polymer based on vinyl chloride in a mixture in certain proportions with polynorbornene.

The present invention therefore first relates to a composition comprising a mixture of about 20 to 70 parts by weight of polynorbornene, about 80 to 30 parts by weight of a polymer based on vinyl chloride and of at least one conventional plasticiser for polynorbornene and a polymer based on vinyl chloride in an amount sufficient for reducing the glass-transition temperature of polynorbornene down to the range of rubbers.

In the context of the present invention, "a polymer based on vinyl chloride" is understood to mean a polymer comprising at least 90 mol % of units derived from vinyl chloride and, where appropriate, up to 10 mol % of units derived from a monomer which is copolymerisable with vinyl chloride, such as, for example, vinyl acetate, or even a vinyl chloride polymer which has undergone a catalytic chlorination treatment which has given it a chlorine content which can amount to up to 72% by weight.

In the context of the present invention, polynorbornene is understood to mean an amorphous polymer or copolymer of bicyclo[2.2.1]-2-heptene and its substituted derivatives, such as described in the patent U.S. Pat. No. A-3,676,390. The third component of the composition according to the invention is a compound having the characteristic feature of being known at the same time as a plasticiser for polynorbornene and as a plasticiser for polymers based on vinyl chloride, this characteristic feature ensuring good compatibility between the two polymers. Examples of plasticisers of this type are diesters of phthalic acid and alcohols having 4 to 13 carbon atoms, such as dioctyl phthalate, diisooctyl phthalate, didecyl phthalate, dinonyl phthalate, didodecyl phthalate and isomers thereof. The conventional plasticiser for polynorbornene and the polymer based on vinyl chloride is in general used in an amount of at least approximately 15 parts by weight, preferably approximately 15 to 120 parts by weight, per 100 parts of the mixture of polynorbornene and the polymer based on vinyl chloride.

In order to improve the balance between properties of the compositions according to the invention, it is advantageous to carry out the crosslinking of polynorbornene, for example, by a dynamic vulcanisation process. Accordingly, the present invention secondly relates to a thermoplastic composition comprising a mixture of about 20 to 70 parts by weight of crosslinked polynorbornene, about 80 to 30 parts by weight of a polymer based on vinyl chloride and of at least one conventional plasticiser for polynorbornene and the polymer based on vinyl chloride in an amount sufficient for reducing the glass-transition temperature of polynorbornene down to the range of rubbers.

The polynorbornene, the polymer based on vinyl chloride and their common plasticiser have already been described above in detail with reference to the compositions comprising a non-crosslinked polynorbornene. In the thermoplastic compositions according to the invention, the crosslinked plasticised polynorbornene is advantageously present in the form of small dispersed particles, which makes it possible to process and use the composition like any other thermoplastic material.

Any crosslinking system suited to the vulcanisation of diene rubber can be used for the crosslinking of polynorbornene in the thermoplastic compositions according to the invention. Of the crosslinking agents which are satisfactory for rubbers, vulcanising agents based on sulphur, peroxide, phenolic resin, azo, maleimide, quinonoid and urethane compounds, such as, for example, free sulphur or sulphur-releasing compounds, such as tetramethylthiuram disulphide, thiuram disulphide, benzothiazyl disulphide and dipentamethylenethiuram hexasulphide, or alternatively m-phenylenebis(maleimide), benzoquinone dioxime, lead peroxide, di(ortho-tolyl)-guanidine, 4,4'-dithiodimorpholine and the like may be mentioned. These vulcanising agents can advantageously be used in combination with at least one vulcanisation activator or accelerator such as zinc oxide, magnesium oxide, benzothiazolesulphamide, tin chloride, zinc dibutyldithiocarbamate, zinc phenylethyldithiocarbamate, tellurium ethyldithiocarbamate, chlorosulphonated polyethylene and the like. When free sulphur or a sulphur-releasing compound is used as vulcanising agent, it is preferable to use a large quantity of vulcanisation activator or accelerator, i.e. for example, a weight of activator or accelerator between about 1 and 3 times the weight of vulcanising agent.

The constituents of the crosslinking system and especially the vulcanising agent are used in customary proportions familiar to one skilled in the art for achieving almost complete crosslinking of polynorbornene without however reducing its elasticity to the point where it is no longer rubber-like. In the thermoplastic compositions according to the invention, the polynorbornene is preferably crosslinked up to the point where not more than 10%, preferably not more than 5%, of polynorbornene can be extracted with a solvent, such as boiling xylene, in which non-crosslinked polynorbornene is completely soluble.

The polymer based on vinyl chloride and used in the compositions according to the present invention preferably has a viscosity index in 1% strength cyclohexanone solution at 20° C. between 50 and 100, measured according to the NF Standard T 51013. It can likewise contain in a manner known per se at least one stabiliser, at least one agent for trapping hydrochloric acid, such as a calcium salt, barium salt, zinc salt or tin salt, at least one agent for protection against ultraviolent radiation, and/or at least one flame retardant. It can also contain up to 10% by weight of a filler, such as titanium oxide, carbon black and the like. It can contain a secondary plasticiser in combination with the phthalic diester, such as epoxidised soya bean oil, or a chlorinated paraffin in an amount of at most 20% by weight.

Furthermore, the compositions according to the present invention can comprise:

at least one second plasticiser for polynorbornene, such as a heavy aromatic, naphthenic or paraffinic oil derived from petroleum, having a freezing point of less than 0° C. and a flashpoint above 180° C. The amount of the second plasticiser used depends evidently on the amount of plasticiser customary for polynorbornene and the polymer based on vinyl chloride already introduced into the composition. It is in general between 0 and 300 parts by weight per 100 parts of polynorbornene, at least one polymer miscible with the polymer based on vinyl chloride, such as nitrile rubber, chlorinated polyethylene, an ethylene/vinyl acetate copolymer comprising up to 50% by weight of acetate, an acrylic latex (according to the definition, composed of elastomer particles based on alkyl acrylate (for example butyl) and partially crosslinked and surrounded by a hard layer based on methyl polymethacrylate), and the like. This polymer can be present in a proportion of up to 60 parts by weight per 100 parts of the polymer based on vinyl chloride.

The properties of the compositions according to the invention can be modified in an advantageous manner for the requirements of certain specific uses by adding conventional ingredients, such as:

white pigments (titanium oxide) or coloured pigments, coupling agents, such as silanes or titanates, anti-degradation agents, such as, for example, the zinc salt of mercaptobenzimidazole, stabilisers, such as, for example, polymerised 2,2,4-trimethyl-1,2-dihydroquinoline, processing aids, such as aliphatic long-chain amines, salts of stearic acid and the like, fillers in powder form, such as carbon black, silica, kaolin, alumina, clay, aluminosilicate, talc, carbonate, and lubricants, such as stearic acid.

The addition of fillers in powder form has in particular the effect of improving the rupture strength and in certain cases the elongation at break of the thermoplastic composition according to the invention. The amount of filler which can be incorporated in the composition can reach up to 150 parts per 100 parts by weight of polynorbornene, this amount being of course variable according to the nature of the filler.

The thermoplastic compositions according to the invention in which the polynorbornene is crosslinked are preferably prepared by dynamic vulcanisation, i.e. by kneading a mixture of polynorbornene, a polymer based on vinyl chloride, plasticiser customary for these two polymers, ethylene/α-olefin copolymer and a crosslinking system (as defined above) at a temperature sufficiently high and over a period sufficiently long for crosslinking the polynorbornene. The kneading can be carried out in a conventional apparatus, such as, for example, a Banbury kneader, a Brabender kneader, a Rhéocord kneader or an extruder, at a temperature between about 110° and 220° C. for a period between about 3 and 15 minutes, this period being shorter the higher the temperature of the material. Before this kneading step, the mixture can first be homogenised in an internal mixer at a moderate temperature between about 40° and 100° C.

The compositions according to the invention can be used for the manufacture of finished products and industrial articles by the extrusion, injection-moulding and compression-moulding techniques. Concrete applications of the compositions according to the invention comprise especially flexible tubes, seals for the construction and automobile industries, protective bellows for the automobile industry, injection-moulded articles, such as solid wheels for the toy industry, and the like.

The examples below are given for non-limiting illustration of the present invention.

EXAMPLES 1 TO 3

In a first step, polynorbornene marketed by the applicant company under the name NORSOREX®is formulated together with plasticiser 2 (naphthenic petroleum oil of flashpoint 195° C. marketed by TEXACO under the name DEALEN RD 25), dioctyl phthalate, a lubricant (stearic acid), an antioxidant (marketed by CIBA-GEIGY under the name IRGANOX 1010), a powdered filler (calcined kaolin), a vulcanising agent (equimolar mixture of dithiodimorpholine and tetramethylthiuram disulphide), a stabiliser (marketed by BAYER under the name VULKALENT E) and a vulcanisation accelerator (mixture of zinc oxide, zinc dibutyldithiocarbamate, zinc phenyldithiocarbamate and tellurium ethyldithiocarbamate in the weight ratios 3/2/0.5/1) in a PAPENMEIER powder mixer rotating at 350 revolutions per minute over a period of 20 minutes at a temperature ranging from 25° C. to 60° C. In a second step, a polyvinyl chloride of a particle size below 250 μm and a viscosity index in 1% strength cyclohexanone solution at 20° C. (measured according to NF Standard T 51014) of 70, marketed by LIBURGSE VINYL MAATSCHAPPIJ under the name MARVYLAN S 7102, is plasticised in the same mixer using dioctyl phthalate for 5 minutes at a temperature ranging from 25° C. to 110° C. In a third step, the formulated polynorbornene is mixed with the plasticised polyvinyl chloride in a MIELLI kneader rotating at 60 revolutions per minute and controlled at a temperature of 120° C. for a period of 8 minutes. The resulting composition is removed and compression-moulded into plates of 2.5 mm, on which the following properties are measured:

- Shore A hardness determined according to ASTM Standard D 2240,
- elongation at break, expressed in % and determined according to ASTM Standard D 412,
- compression set (CS) after 22 hours at 70° C., measured with test bars of 12.5 mm compressed by 25% and determined according to ASTM Standard D 395 and expressed in %.
- modulus of 100% elongation, expressed in MPa and determined according to ASTM Standard D 412, and
- swelling ratio by volume after a residence time of 166 hours at 70° C. in an oil referred to as ASTM 3 and determined according to ASTM Standard D 471.

The amounts by weight of the different ingredients of the composition are shown in the table below, as are the measured results of the properties carried out as described above.

TABLE

| Example | 1 | 2 | 3 |
|---|---|---|---|
| Polynorbornene | 66 | 46 | 26 |
| Dioctyl phthalate | 70 | 64 | 58 |
| Plasticiser 2 | 31 | 55 | 31 |
| Filler | 67 | 46 | 26 |
| Vulcanising agent | 2.0 | 1.4 | 0.8 |
| Vuclanisation accelerator | 4.9 | 3.4 | 2.0 |
| Stabiliser | 0.7 | 0.5 | 0.3 |
| Antioxidant | 0.7 | 0.5 | 0.3 |
| Lubricant | 0.3 | 0.2 | 0.1 |
| Polyvinyl chloride | 34 | 54 | 74 |
| Shore A hardness | 38 | 50 | 63 |
| Elongation at break | 520 | 350 | 230 |
| Modulus of 100% | 0.9 | 1.9 | 3.5 |
| CS | 20 | 30 | 41 |
| Swelling by volume | n.d. | 10 | −10 | n.d.: not determined

The negative swelling ratio by volume observed in Example 3 means that the oil ASTM 3 has extracted a portion of the plasticiser of the composition.

We claim:

1. Thermoplastic composition comprising a mixture of 20 to 70 parts by weight of crosslinked polynorbornene, 80 to 30 parts by weight of a polymer based on vinyl chloride and of at least one plasticiser customary for polynorbornene and the polymer based on vinyl chloride in an amount sufficient for reducing the glass-transition temperature of polynorbornene down to the range of rubbers.

2. Thermoplastic composition according to claim 1, characterised in that the polynorbornene is crosslinked up to the point where not more than 10% of polynorbornene can be extracted with a solvent.

3. Composition according to one of claims 1 or 2, characterised in that the polymer based on vinyl chloride is a polymer comprising at least 90 mol % of units derived from vinyl chloride and, where appropriate, up to 10 mol % of units derived from a monomer which is copolymerisable with vinyl chloride, or a vinyl chloride polymer which has undergone a catalytic chlorination treatment which has given it a chlorine content which can amount to up to 72% by weight.

4. Thermoplastic composition according to claim 1, characterised in that it furthermore comprises at least one additive chosen from white pigments or coloured pigments, coupling agents, antidegradation agents, stabilisers, processing aids, powdered fillers and lubricants.

5. Thermoplastic composition according to claim 4, characterised in that said additive is a powdered filler used in an amount of up to 150 parts per 100 parts by weight of polynorbornene.

6. Composition according to claim 1, characterised in that the plasticiser customary for polynorbornene and the polymer based on vinyl chloride is a diester of phthalic acid and alcohols having 4 to 13 carbon atoms.

7. Composition according to claim 1, characterised in that the plasticiser customary for polynorbornene and the polymer based on vinyl chloride is present in an amount of at least 15 parts by weight per 100 parts of the mixture consisting of polynorbornene and the polymer based on vinyl chloride.

8. Composition according to claim 1, characterised in that it furthermore comprises at least a second plasticiser for polynorbornene having a freezing point below 0° C. and a flashpoint above 180° C.

9. Composition according to claim 1, characterised in that it furthermore comprises at least one polymer miscible with the polymer based on vinyl chloride.

10. Process for the preparation of a thermoplastic composition according to claim 1, characterised in that a mixture of polynorbornene, a polymer based on vinyl chloride, a plasticiser customary for polynorbornene and the polymer based on vinyl chloride and a crosslinking system is kneaded at a temperature sufficiently high and for a period sufficiently long for crosslinking the polynorbornene.

11. Process according to claim 10, characterised in that the mixing is carried out at temperatures between 110° C. and 220° C.

12. The composition according to claim 8, wherein the second plasticizer for polynorbornene is selected from the group consisting of a heavy aromatic, naphthenic or paraffinic oil derived from petroleum.

* * * * *